(12) United States Patent
Kashiki

(10) Patent No.: US 7,199,943 B2
(45) Date of Patent: Apr. 3, 2007

(54) WIDE-ANGLE ZOOM LENS

(75) Inventor: Yasutaka Kashiki, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/213,896

(22) Filed: Aug. 30, 2005

(65) Prior Publication Data
US 2006/0056054 A1    Mar. 16, 2006

(30) Foreign Application Priority Data
Aug. 31, 2004    (JP) ............................. 2004-251641

(51) Int. Cl.
*G02B 15/14* (2006.01)

(52) U.S. Cl. ...................... 359/689; 359/680

(58) Field of Classification Search ............... 359/680, 359/681, 682, 689
See application file for complete search history.

(56) References Cited

U.S. PATENT DOCUMENTS 4,099,846 A    7/1978    Kawamura et al.
5,801,887 A *  9/1998    Sato ......................... 359/691
5,831,773 A   11/1998    Sato
6,853,497 B2 * 2/2005    Yoneyama ................. 359/689

* cited by examiner

*Primary Examiner*—Scott J. Sugarman
*Assistant Examiner*—M. Hasan
(74) *Attorney, Agent, or Firm*—Kenyon & Kenyon LLP

(57) ABSTRACT

The invention relates to a wide-angle zoom lens system easy to ensure telecentricity particularly suited for digital single-lens reflex cameras. The wide-angle zoom lens system comprises a first group G1 of negative power, a second group G2 of positive power and a third group G3 of positive power. Upon zooming from a wide-angle end to a telephoto end, at least the first group G1 and the second group G2 move such that a spacing between the first group G1 and the second group G2 becomes narrow and a spacing between the second group G2 and the third group G3 becomes wide. The first group G1 comprises, in order from its object side, a first lens subgroup SG1*a* of negative refracting power and a second lens subgroup SG1*b* of negative refracting power. Upon focusing from a far object point to a near object point, the first lens subgroup SG1*a* and the second lens subgroup SG1*b* move toward the object side with a narrowing spacing between them.

19 Claims, 4 Drawing Sheets

WIDE-ANGLE ZOOM LENS

This application claims benefit of Japanese Application No. 2004-251641 filed in Japan on Aug. 31, 2004, the contents of which are herein incorporated by this reference.

BACKGROUND OF THE INVENTION

The present invention relates generally to a wide-angle zoom lens equipped with a wide-angle end having a large angle of view, and more specifically to a wide-angle zoom lens for cameras using electronic imaging devices such as CCDs or C-MOSs, especially, a wide-angle zoom lens lending itself well to digital single-lens reflex cameras having a reflecting surface at its back focus.

There is now a growing market for single-lens reflex cameras using electronic imaging devices such as CCDs or C-MOSs. So far, zoom lenses used with conventional silver-halide film single-lens reflex cameras having an angle of view (2ω) of about 80° on the wide-angle side, an F-number of about 3.5 and a zoom ratio exceeding 3 have been often made up of a first lens group of negative power and a second lens group of positive power. As well known with some zoom lenses, focusing is carried out with the first lens group. Also, there has been proposed a zoom lens in which, at an angle of view (2ω) of about 85° or greater on the wide-angle side, the first lens group of negative power is divided into two subgroups with a varying spacing, as typically shown in patent publications 1 and 2.

Patent Publication 1
JP(A) 52-32342
Patent Publication 2
JP(A) 9-171139

Generally, single-lens reflex cameras using electronic imaging devices such as CCDs are smaller in the diagonal length of an image pickup plane than silver-halide film single-lens reflex cameras. In consideration of the so-called shading phenomenon, it is required to strike light beams on an image pickup plane substantially vertically from its center to its periphery. It is also required to allow for space for receiving a low-pass filter and so on. This causes an increase in the optical path length (back focus fb) ratio between the final surface of the taking lens needed for the diagonal length (the image-side surface of the lens nearest to the image side) and the image pickup plane. If this ratio is increased, there may then be obtained additional functions. On the other hand, the need for an increased back focus fb leads to the need for revamping a taking lens having a relatively short focal length.

However, there is not that more known about a zoom lens suitable for a single-lens reflex camera using an electronic imaging device and having an angle of view (2ω) of the order of 80° on the wide-angle side and a zoom ratio of higher than 3 yet capable of keeping high performance as near as object points at close range.

SUMMARY OF THE INVENTION

In view of such situations of the prior art, the primary object of the invention is to provide a wide-angle zoom lens easy to ensure telecentricity best suited for digital single-lens reflex cameras. One particular object of the invention is to provide a wide-angle zoom lens that ensures to easily reduce aberration fluctuations with focusing. Another particular object of the invention is to provide a wide-angle zoom lens having high telecentricity with good aberration performance.

According to one aspect of the invention, there is provided a wide-angle zoom lens system, characterized by comprising in order from an object side to an image side thereof, a first lens group of negative refracting power,
a second lens group of positive refracting power, and
a third lens group of positive refracting power, wherein:
upon zooming from a wide-angle end to a telephoto end, at least said first lens group and said second lens group move such that a spacing between said first lens group and said second lens group becomes narrow and a spacing between said second lens group and said third lens group becomes wide, said first lens group consists of, in order from an object side thereof, a first lens subgroup SG1$a$ of negative refracting power and a second lens subgroup SG1$b$ of negative refracting power, upon focusing from a far object point to a near object point, said first lens subgroup SG1$a$ and said second lens subgroup SG1$b$ move toward the object side with a narrowing spacing between said first lens subgroup SG1$a$ and said second lens subgroup SG1$b$, and said wide-angle zoom lens system is provided as a three-group zoom lens.

According to another aspect of the invention, there is provided a wide-angle zoom lens system, characterized by comprising in order from an object side to an image side thereof, a first lens group of negative refracting power,
a second lens group of positive refracting power, and
a third lens group of positive refracting power, wherein:
upon zooming from a wide-angle end to a telephoto end, at least said first lens group and said second lens group move such that a spacing between said first lens group and said second lens group becomes narrow and a spacing between said second lens group and said third lens group becomes wide, and said first lens group comprises in order from an object side thereof, a 1-$1^{st}$ lens of negative refracting power,
a 1-$2^{nd}$ lens of negative refracting power,
a 1-$3^{rd}$ lens of negative refracting power,
a 1-$4^{th}$ lens, and
a 1-$5^{th}$ lens of positive refracting power.

According to yet another aspect of the invention, there is provided a wide-angle zoom lens system, characterized by comprising in order from an object side to an image side thereof, a first lens group of negative refracting power,
a second lens group of positive refracting power, and
a third lens group of positive refracting power, wherein:
upon zooming from a wide-angle end to a telephoto end, at least said first lens group and said second lens group move such that a spacing between said first lens group and said second lens group becomes narrow and a spacing between said second lens group and said third lens group becomes wide, and said second lens group consists of, in order from an object side thereof, a 2-$1^{st}$ lens that is a positive meniscus lens convex on an object side thereof, a 2-$2^{nd}$ lens that is a positive meniscus lens convex on an object side thereof, a 2-$3^{rd}$ lens that is a negative lens,
a 2-$4^{th}$ lens that is a positive lens, and a 2-5$^{th}$ lens that has an aspheric surface, wherein said 2-3$^{rd}$ lens and said 2-4$^{th}$ lens are cemented together with a cementing surface having divergent refracting power.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Possible arrangements and examples of the wide-angle zoom lens of the invention are now explained.

The first wide-angle zoom lens system of the invention is characterized by comprising, in order its object side to its image side, a first lens group of negative refracting power, a second lens group of positive refracting power and a third lens group of positive refracting power, wherein:

upon zooming from a wide-angle end to a telephoto end, at least the first lens group and the second lens group move with a narrowing spacing between the first lens group and the second lens group and a widening spacing between the second lens group and the third lens group, and the first lens group consists of, in order from its object side, a first lens subgroup SG1a of negative refracting power and a second lens subgroup SG1b of negative refracting power, and upon focusing from a far object point to a near object point, the first lens subgroup SG1a and the second lens subgroup SG1b move toward the object side with a narrowing spacing between them.

The advantage of, and the requirement for, the first wide-angle zoom lens system of the invention arranged as recited above is now explained.

To ensure a back focus fb in the wide-angle zoom lens of the invention, the first lens group of negative refracting power and the second lens group of positive refracting power are allowed to cooperate into the retrofocus type. Further, to strike a light beam on the image pickup plane at an angle close to verticality, there is located the third lens group of positive refracting power. When such a lens layout is configured into a wide-angle arrangement, the power of the first lens group of negative refracting power is likely to become strong. Accordingly, focusing with the first lens group gives rise to noticeable aberration fluctuations. Especially with the zoom lens system focused from infinity to the closest range, positive field curvature is likely to occur at the wide-angle end. Here, if the first lens group of negative refracting power is divided into two negative lens subgroups (SG1a, SG1b) and both subgroups are moved toward the object side with a narrowing spacing between them, negative field curvature is then produced to prevent peripheral performance deterioration. It is thus possible to provide an optical system capable of maintaining high performance from an infinite object point up to a close-range object point.

According to the second aspect of the invention, the first wide-angle zoom lens system is further characterized in that the first lens subgroup SG1a is composed of one negative meniscus lens concave on its image side.

The advantage of, and the requirement for, the second wide-angle zoom lens of the invention arranged as recited above is now explained. With such an arrangement, it is possible to effectively produce negative field curvature with a fewer lenses.

According to the third aspect of the invention, the second wide-angle zoom lens system is further characterized in that the second lens subgroup SG1b is made up of a lens group wherein the surface nearest to the object side is convex on the object side.

The third wide-angle zoom lens system of the invention arranged as recited above is favorable for a wide-angle layout with reduced off-axis aberrations, because of a smaller angle of incidence of off-axis light rays on the lens surface.

More preferably, the lens nearest to the object side in the second lens group SG1b should be a negative meniscus lens, because off-axis aberrations are much more reduced.

The fourth wide-angle zoom lens system of the invention is characterized by comprising, in order from its object side to its image side, a first lens group of negative refracting power, a second lens group of positive refracting power and a third lens group of positive refracting power, wherein:

upon zooming from a wide-angle end to a telephoto end, at least the first lens group and the second lens group move with a narrowing spacing between the first lens group and the second lens group and a widening spacing between the second lens group and the third lens group, and the first lens group comprises in order from its object side, a 1-1$^{st}$ lens of negative refracting power, a 1-2$^{nd}$ lens of negative refracting power, a 1-3$^{rd}$ lens of negative refracting power, a 1-4$^{th}$ lens and a 1-5$^{th}$ lens of positive refracting power.

The advantage of, and the requirement for, the fourth wide-angle zoom lens system of the invention arranged as recited above is now explained.

In the wide-angle zoom lens system of the invention, reducing various aberrations at each lens group is important to prevent performance deterioration by decentration at the time of assembling. To facilitate this, it is desired to incorporate negative and positive elements in each lens group. In a wide-angle zoom lens of the retrofocus type with the negative group at the front such as one contemplated herein, the optical system becomes asymmetric. For this reason, off-axis aberrations that give rise to deterioration in image formation capability, for instance, coma and astigmatism, and distortion leading to image distortion are likely to occur at the first lens group. The stronger divergence at the first lens group, the more noticeable this phenomenon becomes. However, when the desired back focus is obtained and the total length of the optical system is shortened, that divergence must be enhanced. With such restrictions working against each other in mind and to ensure strong divergence at the first lens group, the 1-1$^{st}$ lens of negative refracting power, the 1-2$^{nd}$ lens of negative refracting power and the 1-3$^{rd}$ lens of negative refracting power are located in order from the object side to the image side of the optical system, so that various aberrations such as coma and astigmatism occurring at the respective lenses can be reduced as much as possible, and one positive lens is located as the 1-5$^{th}$ lens following the 1-4$^{th}$ lens, so that chromatic aberrations occurring in the first lens group are canceled therein. In this case, if a positive lens is located nearest to the object side of the first lens group without recourse to such a lens layout, it will be attributable to rendering the first lens group bulky.

According to the fifth aspect of the invention, the fourth wide-angle zoom lens system is further characterized in that at least one aspheric surface is incorporated in the first lens group.

Referring to the advantage of, and the requirement for, the fifth wide-angle zoom lens system of the invention, it is preferred that at least one aspheric surface be included in the first lens group. This helps make tight correction of distortion.

According to the sixth aspect of the invention, the fourth wide-angle zoom lens system is further characterized in that the 1-4$^{th}$ lens is a plastic lens having an aspheric surface.

The advantage of, and the requirement for, the sixth wide-angle zoom lens of the invention arranged as recited above is now explained. As well known in the art, the location of an aspheric surface provides an effective means for correction of distortion. However, glass aspheric lenses are costly to fabricate. In view of cost, therefore, it is preferable to make use of a plastic aspheric les. With plastics, however, problems are that their performance is susceptible to change due to environmental changes such as temperature changes, and some contrivances are needed for using them. In the first lens group according to the invention, the 1-4$^{th}$ lens is positioned for correction of aberrations such that a rim light beam bent by negative refracting power is roughly parallel with the optical axis, so that the negative refracting power of the first lens group is reduced down to a relatively weak level. This enables the refracting power of this lens to be reduced down to a relatively weak level, and makes it possible to use a plastic aspheric lens for that lens to keep it against the influences of temperature changes. The location of the aspheric lens of weak refracting power at the position of this lens is also favorable for correction of distortion while reducing influences on correction of axial aberrations.

This plastic lens could be a molded lens fabricated by molding.

According to the seventh aspect of the invention, any one of the fourth to sixth wide-angle zoom lens systems is further characterized in that the 1-4$^{th}$ lens is an aspheric lens that satisfies the following conditions:

$$10 < |f_{1-4}/f_w| \tag{1}$$

$$3 < |r_7/f_w| \tag{2}$$

$$3 < |f_8/f_w| \tag{3}$$

Here $f_{1-4}$ is the focal length of the 1-4$^{th}$ lens, $r_7$ and $r_8$ are the axial radii of curvature of the object-side and image-side surfaces of the 1-4$^{th}$ lens, respectively, and $f_w$ is the focal length of the whole wide-angle zoom lens system at the wide-angle end.

The advantage of, and the requirement for, the 7$^{th}$ wide-angle zoom lens system of the invention arranged as recited above is now explained. If the 1-4$^{th}$ lens in the first lens group has refracting power weak enough to satisfy condition (1), its influence on axial aberrations can be lessened. Then, if the aspheric lens is used for this lens, it will be more favorable for correction of distortion while reducing influences on axial aberrations.

For condition (1), it is more desired that the lower limit be 15, especially 20, because a clear distinction can be made between correction of distortion and correction of axial aberrations.

If the 1-4$^{th}$ lens is configured in such a way as to satisfy both conditions (2) and (3), it will be helpful for fabrication of an aspheric surface conforming to the angle of incidence of off-axis light rays. More preferably for correction of off-axis aberrations, $r_7$ should be >0 and $r_8$ should be >0.

According to the eighth aspect of the invention, the seventh wide-angle zoom lens system is further characterized that the aspheric surface is located on the object side of the 1-4$^{th}$ lens, and configured in such a way as to bring the refracting power in a positive direction with distance from its center.

The advantage of, and the requirement for, the eighth wide-angle zoom lens system of the invention arranged as recited above is now explained. Such configuration allows the 1-4$^{th}$ lens to have positive or negative refracting power on the optical axis, and to have increasing positive refracting power with distance from its center. This is more favorable for correction of distortion.

According to the ninth aspect of the invention, any one of the 4$^{th}$ to 8$^{th}$ wide-angle zoom lens systems is characterized by being provided as a three-group zoom lens.

According to the 10$^{th}$ aspect of the invention, there is provided a wide-angle zoom lens system, characterized by comprising in order from an object side to an image side thereof, a first lens group of negative refracting power, a second lens group of positive refracting power, and a third lens group of positive refracting power, wherein:

upon zooming from a wide-angle end to a telephoto end, at least said first lens group and said second lens group move such that a spacing between said first lens group and said second lens group becomes narrow and a spacing between said second lens group and said third lens group becomes wide, and said second lens group consists of, in order from an object side thereof, a 2-1$^{st}$ lens that is a positive meniscus lens convex on its object side, a 2-2$^{nd}$ lens that is a positive meniscus lens convex on its object side, a 2-3$^{rd}$ lens and a 2-4$^{th}$ lens that are a negative lens and a positive lens in order from its object side and form together a divergent cementing surface, and a 2-5$^{th}$ lens that has an aspheric surface.

The advantage of, and the requirement for, the 10$^{th}$ wide-angle zoom lens of the invention arranged as recited above is now explained.

In the wide-angle zoom lens system of this invention, holding back various aberrations at each lens group is important for prevention of performance deterioration due to decentration upon assembling. To facilitate this, it is desired to incorporate negative and positive elements in the second lens group. In the retrofocus type with the negative group at the front, the second lens group that takes a substantial zooming role has large refracting power, and is likely to produce aberrations as well. For this reason, the arrangement of the second lens group is important for achievement of satisfactory image-formation capability. The refracting power of the second lens group is substantially born by two positive meniscus lenses located nearer to its object side. To facilitate zooming at the telephoto end, it is desired to locate the principal point positions of the second lens group on the object side. To this end and to keep the second lens group against aberrations, two positive lenses are located nearer to its object side. Further, the doublet (consisting of a negative lens and a positive lens in this order) having a divergent cementing surface is located for zeroing in on removal of chromatic aberrations, and reducing aberrations at the second lens group as well. Furthermore, the incorporation of the aspheric surface in the 2-5$^{th}$ lens ensures elimination of off-axis aberrations such as coma and astigmatism.

According to the 11$^{th}$ aspect of the invention, the 10$^{th}$ wide-angle zoom lens system is further characterized in that the cemented lens composed of the 2-3$^{rd}$ lens and the 2-4$^{th}$ lens satisfies condition (4):

$$0.365 < N_{d23} - N_{d24} \quad (4)$$

Here $N_{d23}$ and $N_{d24}$ are the d-line refractive indices of the 2-3$^{rd}$ lens and the 2-4$^{th}$ lens, respectively.

The advantage of, and the requirement for, the 11$^{th}$ wide-angle zoom lens system of the invention arranged as recited above is now explained. Satisfaction of condition (4) is effective for not only correction of chromatic aberrations, but also for correction of spherical aberrations and coma due to the divergent surface. The upper limit to condition (4) is determined by the limitation of material, and as the lower limit of 0.365 is not reached, it does hardly allow the cemented lens to exert its own effect. The lower limit to condition (4) could be set at 0.38, especially 0.40.

According to the 12$^{th}$ aspect of the invention, the 10$^{th}$ or 11$^{th}$ wide-angle zoom lens system is further characterized by being designed as a three-group zoom lens.

According to the 13$^{th}$ aspect of the invention, any one of the 1$^{st}$ to 12$^{th}$ wide-angle zoom lens systems is further characterized in that just in front of the object side of the second lens group, there is provided an aperture stop that moves in unison with the second lens group upon zooming.

The advantage of, and the requirement for, the 13$^{th}$ wide-angle zoom lens system of the invention arranged as recited above is now explained. With the location of the aperture stop just in front of the object side of the second lens group, the second lens group where there are large aberrations can be slimmed down with the result that aberrations can be well corrected.

The location of the aperture stop just in front of the object side of the second lens group is also effective for keeping back such an increase in the diameter of the first lens group as often encountered in the case of a wide-angle lens. Further, as the aperture stop is allowed to move together with the second lens group upon zooming, it leads to simplification of construction.

According to the 14$^{th}$ aspect of the invention, any one of the 1$^{st}$ to 3$^{rd}$ wide-angle zoom lens systems is further characterized in that the first lens group comprises, in order from its object side, a 1-1$^{st}$ lens of negative refracting power, a 1-2$^{nd}$ lens of negative refracting power, a 1-3$^{rd}$ lens of negative refracting power, a 1-4$^{th}$ lens, and a 1-5$^{th}$ lens of positive refracting power.

According to the 15$^{th}$ aspect of the invention, any one of the 1$^{st}$ to 9$^{th}$ wide-angle zoom lens systems is further characterized in that the second lens group is made up of, in order from its object side, a 2-1$^{st}$ lens that is a positive meniscus lens convex on its object side, a 2-2$^{nd}$ lens that is a positive meniscus lens convex on its object side, a 2-3$^{rd}$ lens and a 2-4$^{th}$ lens that are a negative lens and a positive lens as viewed from the object side of the second lens group and form together a divergent cementing surface, and a 2-5$^{th}$ lens that has an aspheric surface.

According to the 16$^{th}$ aspect of the invention, any one of the 1$^{st}$ to 15$^{th}$ wide-angle zoom lens systems is further characterized in that the third lens group remains fixed upon zooming.

The advantage of, and the requirement for, the 16$^{th}$ wide-angle zoom lens system of the invention arranged as recited above is now explained. As the third lens group remains fixed upon zooming, it enables the lens arrangement to be simplified as much as possible while achieving movement of the exit pupil position at the wide-angle end toward the object side, which is the primary advantage of the third lens group.

According to the 17$^{th}$ aspect of the invention, any one of the 1$^{st}$ to 16$^{th}$ wide-angle zoom lens systems is further characterized in that the third lens group is composed of a cemented lens consisting of a positive lens and a negative lens.

The advantage of, and the requirement for, the 17$^{th}$ wide-angle zoom lens system arranged as recited above is now explained. Such an arrangement ensures that chromatic aberrations at the third lens group are kept back, so that aberrations due to its decentration at the time of assembling can be easily reduced, and one cemented lens guarantees assembling capabilities.

According to the 18$^{th}$ aspect of the invention, any one of the 1$^{st}$ to 17$^{th}$ wide-angle zoom lens systems is further characterized in that the first lens group, the second lens group, and the third lens group comprises a positive lens and a negative lens.

The advantage of, and the requirement for, the 18$^{th}$ wide-angle zoom lens system of the invention arranged as recited above is now explained. Such an arrangement ensures that the influences of aberrations produced due to the decentration of each lens group can be easily minimized.

According to the 19$^{th}$ aspect of the invention, any one of the 1$^{st}$ to 18$^{th}$ wide-angle zoom lens systems is further characterized in that the first lens group, the second lens group, and the third lens group satisfies the following conditions.

$$-0.55 < \phi_1/(-\phi_1+\phi_2+\phi_3) < -0.45 \quad (5)$$

$$0.35 < \phi_2/(-\phi_1+\phi_2+\phi_3) < 0.45 \quad (6)$$

$$0.05 < \phi_3/(-\phi_1+\phi_2+\phi_3) < 0.12 \quad (7)$$

Here $\phi_1$, $\phi_2$ and $\phi_3$ are the reciprocals of the focal lengths of the first lens group, the second lens group and the third lens group, respectively.

The advantage of, and the requirement for, the 19$^{th}$ wide-angle zoom lens system arranged as recited above is now explained. Conditions (5), (6) and (7) define the power of a zoom lens that lends itself well to a wide-angle camera with a built-in electronic imaging device, for instance, one contemplated herein. In the invention, the first lens group is designed to have relatively stronger negative refracting power and the third lens group is permitted to have relatively weaker positive refracting power, thereby achieving a refracting power profile easy enough to ensure a wide-angle, telecentric arrangement.

As there are deviations from the upper limits of −0.45, 045 and 0.12 to conditions (5), (6) and (7) or the lower limits of −0.55, 0.35 and 0.05, the refracting power of each lens group becomes too strong, which may result in the need of using many more lenses to keep back aberrations. Otherwise, the refracting power of each lens group becomes too weak, working against a wide-angle arrangement, leading to a more increased amount of movement of each lens group or rendering telecentricity difficult to achieve.

The lower limit or the upper limit to condition (5) could be set at −0.53 or −0.48.

The lower limit or the upper limit to condition (6) could be set at 0.38 or 0.43.

The lower limit or the upper limit to condition (7) could be set at 0.07 or 0.10.

In the invention, some or all of the conditions as mentioned above could be satisfied at the same time.

The wide-angle zoom lens of the invention could also be designed such that any of off-axis chief rays having a half angle of view of 35° or greater reaches the image plane.

With the invention, it is possible to obtain a wide-angle zoom lens easy to ensure telecentricity particularly well suited for digital single-lens reflex cameras. It is also possible to obtain a wide-angle zoom lens easy to keep back aberration fluctuations with focusing. It is further possible to obtain a wide-angle zoom lens with improved aberration performance and enhanced telecentricity.

Figure 1A:
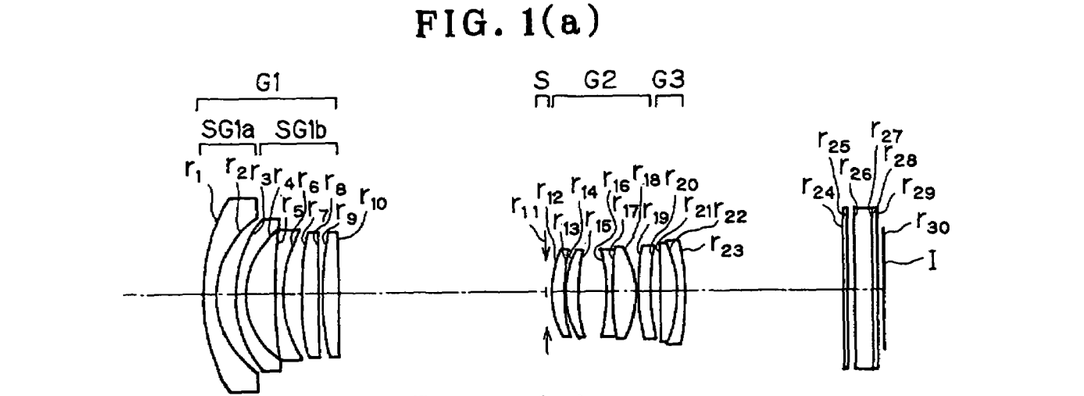
FIG. 1(a) is a sectional view at a wide-angle end of the lens arrangement of Example 1 of the wide-angle zoom lens according to the invention upon focusing on an infinite object point.
Figure 1B:
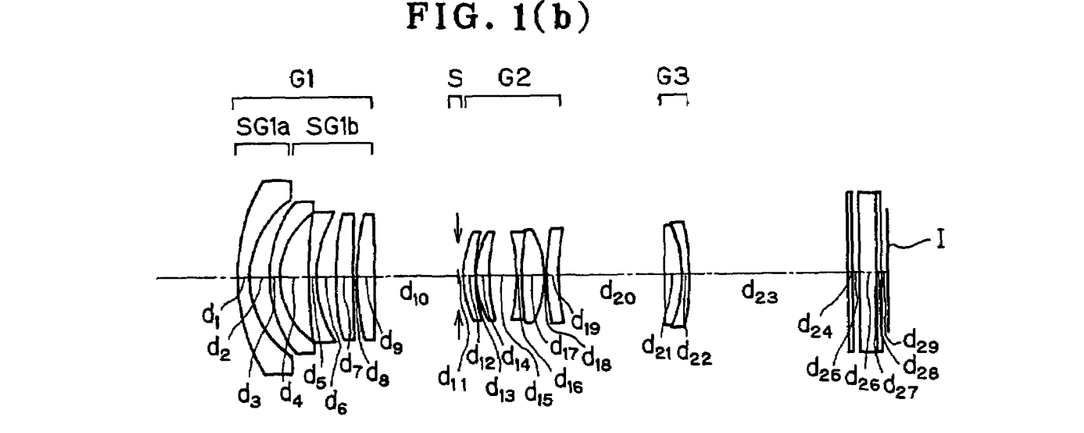
FIG. 1(b) is a sectional view of that of Example 1 in an intermediate setting.
Figure 1C:
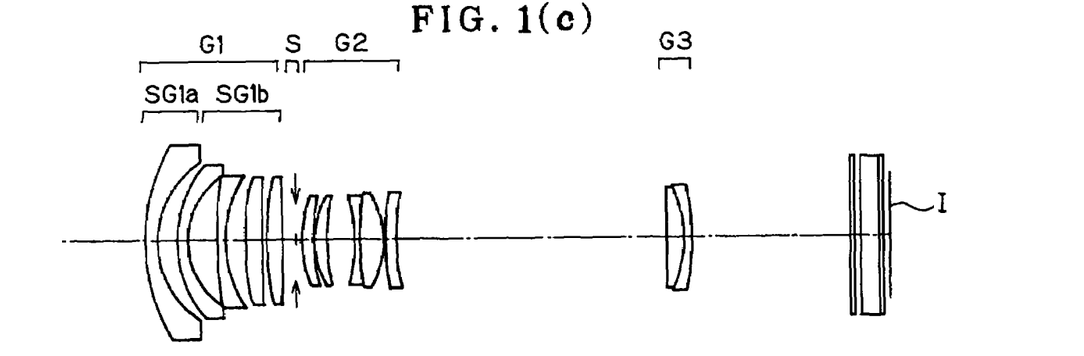
FIG. 1(c) is a sectional view of that of Example 1 at a telephoto end.

The wide-angle zoom lens of the invention is now explained specifically with reference to Example 1. FIG. 1(a) is a sectional view at a wide-angle end of the lens arrangement of Example 1 of the wide-angle zoom lens according to the invention upon focusing on an infinite object point, FIG. 1(b) is a sectional view of that of Example 1 in an intermediate setting, and FIG. 1(c) is a sectional view of that of Example 1 at a telephoto end. Throughout FIGS. 1(a) to 1(c), G1 stands for a first lens group, S an aperture stop, G2 a second lens group, G3 a third lens group, and I an image plane. It is here noted that three plane-parallel plates interposed between the third lens group G3 and the image plane I form together a CCD cover glass made up of an integrally combined dust reduction, IR cut filter and low-pass filter.

EXAMPLE 1

Example 1 is directed to a zoom optical system made up of, in order from its object side, a first lens group G1 having negative refracting power, an aperture stop S, a second lens group G2 having positive refracting power, and a third lens group G3 having positive refracting power. Upon zooming from a wide-angle end to a telephoto end, the first lens group G1 moves in a concave locus toward the object side, the aperture stop S and the second lens group G2 move monotonously in unison, and the third lens group G3 remains fixed.

The first lens group G2 is made up of, in order from its object side, three negative meniscus lenses, each convex on its object side, a positive meniscus lens convex on its object side and a double-convex positive lens, wherein the negative meniscus lens positioned nearest to the object side forms a first lens subgroup SG1a and the remaining two negative meniscus lenses, positive meniscus lens and double-convex positive lens form together a second lens subgroup SG1b. The second lens group G2 is built up of two positive meniscus lenses, each convex on its object side, a doublet consisting of a double-concave negative lens and a double-convex positive lens, and a positive meniscus lens convex on its object side. The third lens group G3 is comprised of a doublet consisting of a positive meniscus lens convex on its image plane side and a negative meniscus lens convex on its image plane side. Two aspheric surfaces are used: one for the object-side surface of the positive meniscus lens in the first lens group G1 and another for the object-side surface of the positive meniscus lens nearest to the image plane side in the second lens group G2. It is here noted that plastic lenses are used for the positive meniscus lens provided with the aspheric surface in the first lens group G1 and the positive meniscus lens provided with the aspheric surface and located nearest to the image plane side in the second lens group G2.

Example 1 provides a wide-angle zoom lens having a back focus fb of about 3 relative to the diagonal length of an image pickup plane. In this connection, the diagonal length of the image pickup plane is 22.3 mm.

Numerical data on Example 1 will be enumerated below. In this conjunction, the symbols used hereinafter but not hereinbefore have the following meanings.

f: focal length of the whole system,
$F_{NO}$: F-number,
w: half angle of view,
WE: wide-angle end,
ST: intermediate setting,
TE: telephoto end,
IO: object-to-image distance,
$r_1, r_2, \ldots$: radius of curvature of each lens surface,
$d_1, d_2, \ldots$: spacing between adjacent lens surfaces,
$n_{d1}, n_{d2}, \ldots$: d-line refractive index of each lens, and
$\nu_{d1}, \nu_{d2}, \ldots$: Abbe constant of each lens.

Here let x represent an optical axis provided that the direction of travel of light is positive, and y stand for a direction orthogonal to the optical axis. Then, aspheric shape is expressed by the following equation.

$$x = (y^2/r)/[1+\{1-(K+1)(y/r)^2\}^{1/2}]A_4 y^4 + A_6 y^6 + A_8 y^8 + A_{10} y^{10}$$

Here r is a paraxial radius of curvature, K is a conical coefficient, and $A_4$, $A_6$, $A_8$ and $A_{10}$ are the fourth-, sixth-, eighth- and tenth-order aspheric coefficients.

In the numerical data on this example, given just below, length is given in mm.

EXAMPLE 1

| | | | |
|---|---|---|---|
| $r_1 = 36.190$ | $d_1 = 2.2$ | $n_{d1} = 1.51633$ | $\nu_{d1} = 64.14$ |
| $r_2 = 17.116$ | $d_2 = $ (Variable) | $n_{d2} = 1.7725$ | $\nu_{d2} = 49.6$ |
| $r_3 = 22.880$ | $d_3 = 1.7$ | $n_{d3} = 1.834$ | $\nu_{d3} = 37.16$ |
| $r_4 = 14.783$ | $d_4 = 5.6$ | $n_{d4} = 1.52542$ | $\nu_{d4} = 55.78$ |
| $r_5 = 97.144$ | $d_5 = 1.5$ | $n_{d5} = 1.84666$ | $\nu_{d5} = 23.78$ |
| $r_6 = 22.116$ | $d_6 = 3.5$ | $n_{d6} = 1.6935$ | $\nu_{d6} = 53.21$ |
| $r_7 = 209.359$ | $d_7 = 3.1$ | $n_{d7} = 1.51633$ | $\nu_{d7} = 64.14$ |
| (Aspheric) | $d_8 = 0.7$ | $n_{d8} = 1.90366$ | $\nu_{d8} = 31.31$ |
| $r_8 = 302.253$ | $d_9 = 3.2$ | $n_{d9} = 1.48749$ | $\nu_{d9} = 70.23$ |
| $r_9 = 49.539$ | $d_{10} = $ (Variable) | $n_{d10} = 1.52542$ | $\nu_{d10} = 55.78$ |
| $r_{10} = -486.879$ | $d_{11} = 1.0$ | $n_{d11} = 1.51633$ | $\nu_{d11} = 64.14$ |
| $r_{11} = \infty$ | $d_{12} = 2.4$ | $n_{d12} = 1.801$ | $\nu_{d12} = 34.97$ |
| (Aperture stop) | $d_{13} = 0.2$ | $n_{d13} = 1.51633$ | $\nu_{d13} = 64.14$ |
| $r_{12} = 21.189$ | $d_{14} = 2.2$ | $n_{d14} = 1.54424$ | $\nu_{d14} = 70.86$ |
| $r_{13} = 40.266$ | $d_{15} = 4.9$ | $n_{d15} = 1.5231$ | $\nu_{d15} = 54.49$ |
| $r_{14} = 17.613$ | $d_{16} = 1.1$ | | |
| $r_{15} = 34.013$ | $d_{17} = 4.2$ | | |
| $r_{16} = -34.286$ | $d_{18} = 0.3$ | | |
| $r_{17} = 64.557$ | $d_{19} = 2.1$ | | |
| $r_{18} = -18.132$ | $d_{20} = $ (Variable) | | |
| $r_{19} = 32.264$ | $d_{21} = 3.0$ | | |
| (Aspheric) | $d_{22} = 1.7$ | | |
| $r_{20} = 41.116$ | $d_{23} = 28.0$ | | |
| $r_{21} = -511.313$ | $d_{24} = 0.6$ | | |
| $r_{22} = -25.101$ | $d_{25} = 1.2$ | | |
| $r_{23} = -44.376$ | $d_{26} = 3.3$ | | |
| $r_{24} = \infty$ | $d_{27} = 0.2$ | | |
| $r_{25} = \infty$ | $d_{28} = 0.8$ | | |
| $r_{26} = \infty$ | $d_{29} = 1.1$ | | |

-continued $r_{27} = \infty$
$r_{28} = \infty$
$r_{29} = \infty$
$r_{30} = \infty$ (Image plane)

Aspherical Coefficients 7 th surface

K = 0.0604
$A_4 = 3.59 \times 10^{-5}$
$A_6 = 3.30 \times 10^{-8}$
$A_8 = 4.88 \times 10^{-10}$
$A_{10} = -3.79 \times 10^{-13}$ 19 th surface K = 0.439
$A_4 = -5.68 \times 10^{-5}$
$A_6 = -1.06 \times 10^{-7}$
$A_8 = -1.56 \times 10^{-9}$
$A_{10} = 1.77 \times 10^{-12}$

|  | WE | ST | TE |
|---|---|---|---|
| Zooming Data ($\infty$) | | | |
| f (mm) | 14.3 | 25.1 | 44.1 |
| $F_{NO}$ | 3.6 | 4.5 | 5.7 |
| $\omega$ (°) | 38.0 | 24.0 | 14.2 |
| $d_2$ | 3.8 | 3.8 | 3.8 |
| $d_{10}$ | 38.3 | 15.4 | 2.4 |
| $d_{20}$ | 1.9 | 19.1 | 49.2 |
| Zooming Data (I O = 380 mm) | | | |
| f (mm) | 14.3 | 25.1 | 44.1 |
| $d_2$ | 3.2 | 3.2 | 3.2 |
| $d_{10}$ | 41.0 | 18.0 | 5.2 |
| $d_{20}$ | 1.9 | 19.1 | 49.2 |

Figure 2A:
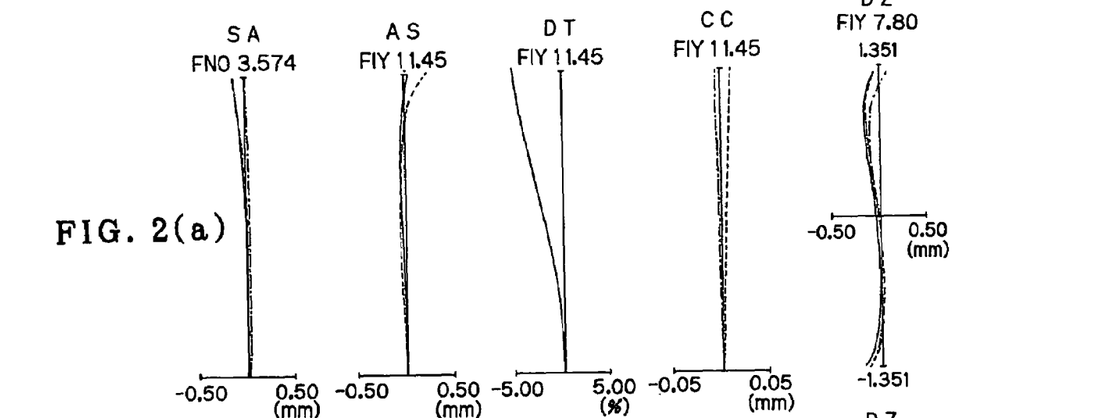
FIGS. 2(a), 2(b) and 2(c) are aberration diagrams for the wide-angle zoom lens of Example 1 upon focusing on an infinite object point.
Figure 2B:
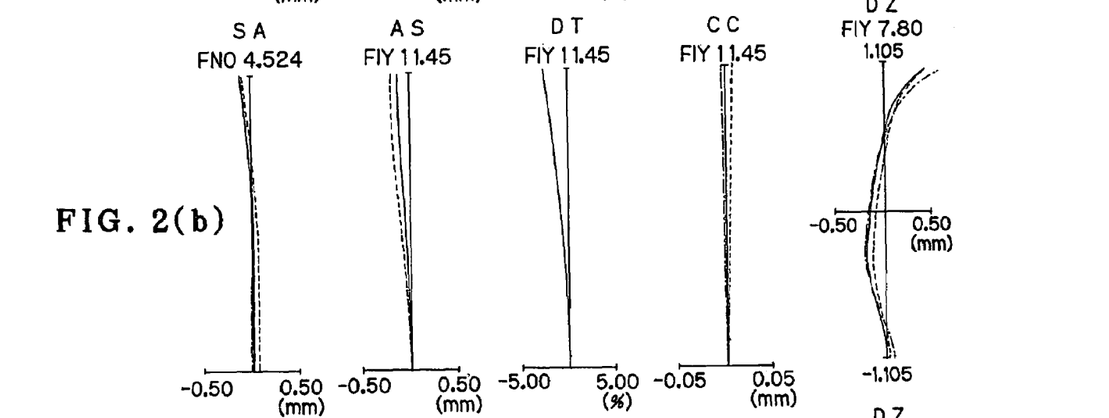
Figure 2C:
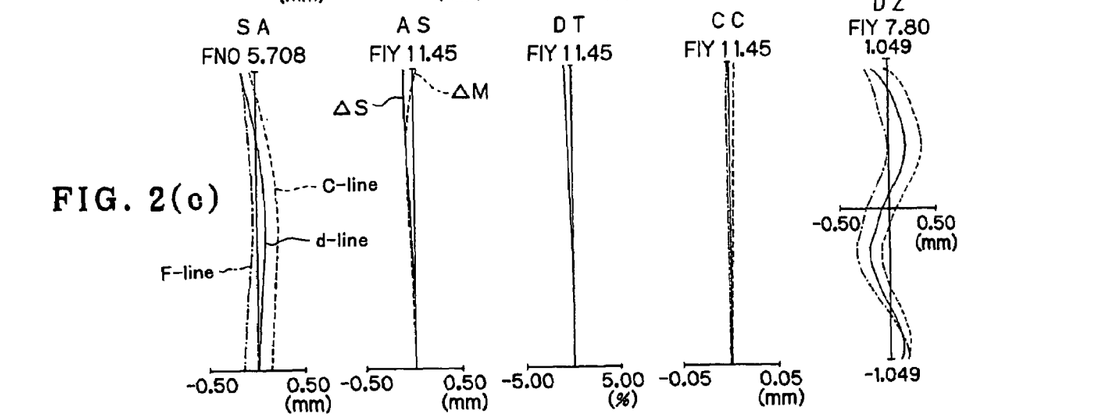
Figure 3A:
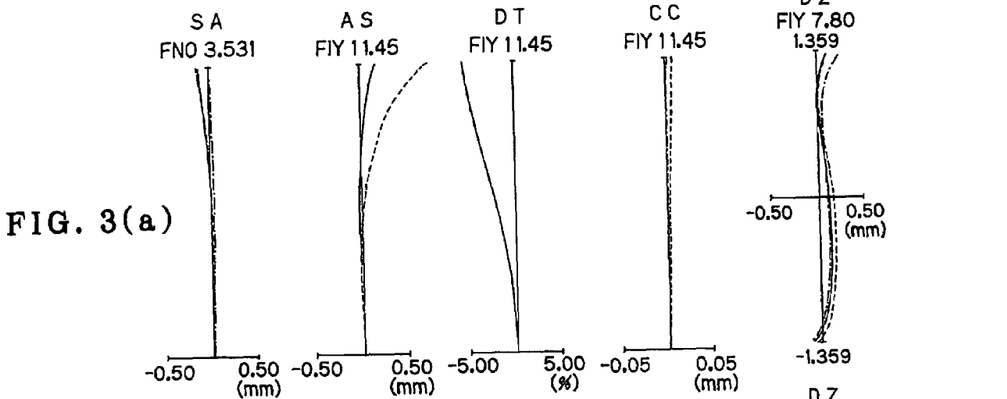
FIGS. 3(a), 3(b) and 3(c) are aberration diagrams for the wide-angle zoom lens of Example 1 upon focusing at an object-to-image distance of IO=380 mm.
Figure 3B:
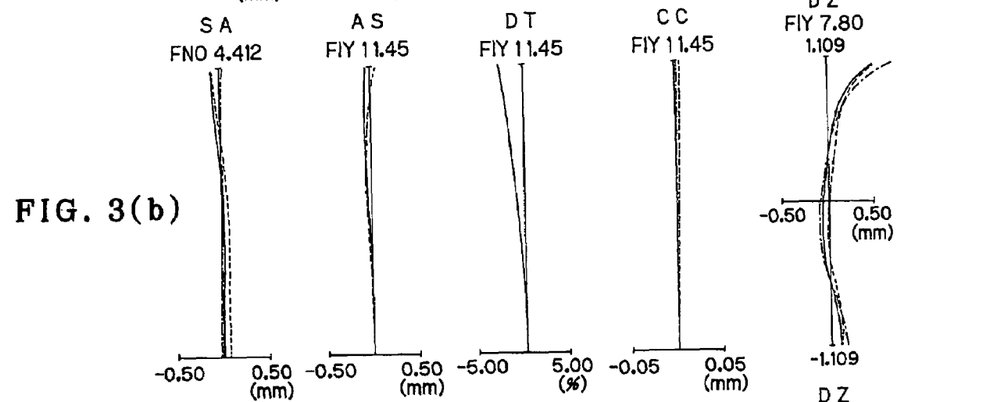
Figure 3C:
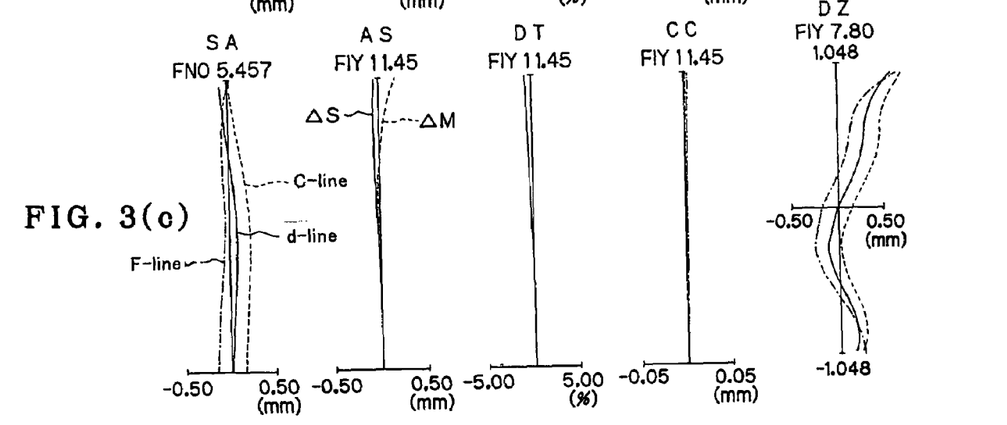

(1) $|f_{1-4}/f_w| = 29.06$
(2) $|r_7/f_w| = 4.75$
(3) $|r_8/f_w| = 6.85$
(4) $N_{d23}-N_{d24} = 0.41617$
(5) $\phi_1/(-\phi_1 + \phi_2 + \phi_3) = -0.517$
(6) $\phi_2/(-\phi_1 + \phi_2 + \phi_3) = 0.401$
(7) $\phi_3/(-\phi_1 + \phi_2 + \phi_3) = 0.082$ FIGS. 2(a), 2(b) and 2(c) are aberration diagrams for Example 1 upon focusing on an infinite object point, and FIGS. 3(a), 3(b) and 3(c) are aberration diagrams for Example 1 upon focusing on an object-to-image distance of IO=380 mm. In these aberration diagrams, (a), (b) and (c) are indicative of spherical aberration (SA), astigmatism (AS), distortion (DT), chromatic aberration of magnification (CC) and coma (DZ) at the wide-angle end, in the intermediate setting, and at the telephoto end, respectively, and "FIY" indicates an image height.

Figure 4:
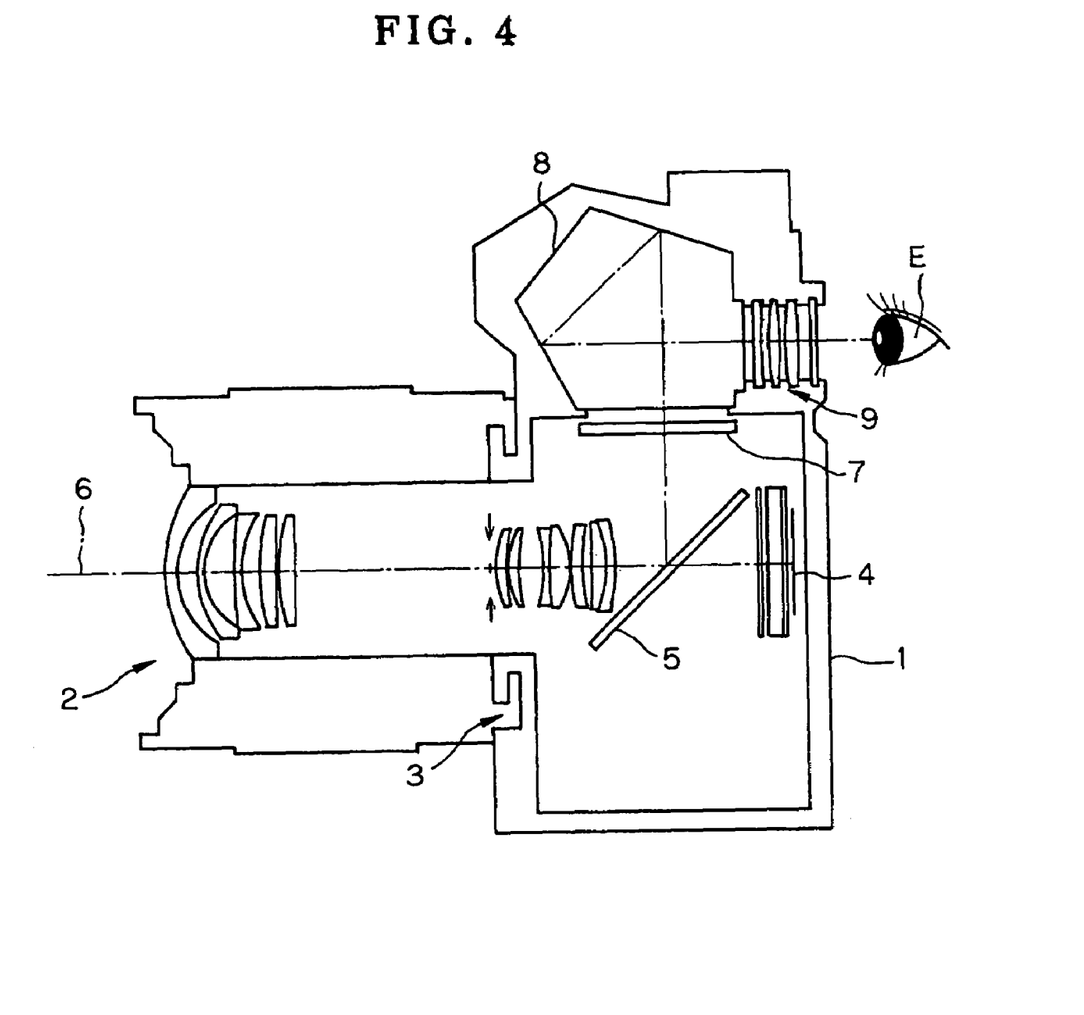
FIG. 4 is illustrative in section of a single-lens reflex camera incorporating the wide-angle zoom lens of the invention.

FIG. 4 is illustrative in section of a lens interchangeable type single-lens reflex camera wherein the inventive wide-angle zoom lens is used and a small-format CCD or C-MOS or the like is used as an imaging device. In FIG. 4, reference numeral 1 is indicative of a single-lens reflex camera, 2 a taking lens system that incorporates the invention and is received in a lens barrel provided with a zooming mechanism and a focusing mechanism, 3 a mount portion of the lens barrel, which is for loading the taking lens system 2 into the single-lens reflex camera 2 in a detachable manner and for which a screw type mount, a bayonet type mount or the like may be used. In this embodiment, the bayonet type mount is used.

Reference numeral 4 stands for an imaging device plane, 5 a quick return mirror interposed on an optical path 6 of the taking lens system 2 between the lens system and the imaging device plane 4, 7 a finder screen positioned on an optical path for light reflected at the quick return mirror 5, 8 a penta prism, 9 a finder, and E an observer's eye (eye point).

For instance, the inventive wide-angle zoom lens exemplified as Example 1 is used as the taking lens system 2 in the single-lens reflex camera 1 of such construction.

I claim:

1. A wide-angle zoom lens system, comprising in order from an object side to an image side thereof,
   a first lens group of negative refracting power,
   a second lens group of positive refracting power, and
   a third lens group of positive refracting power, wherein:
   upon zooming from a wide-angle end to a telephoto end,
      at least said first lens group and said second lens group move such that a spacing between said first lens group and said second lens group becomes narrow and a spacing between said second lens group and said third lens group becomes wide,
   said first lens group consists of, in order from an object side thereof,
   a first lens subgroup SG1a of negative refracting power and
   a second lens subgroup SG1b of negative refracting power,
   upon focusing from a far object point to a near object point, said first lens subgroup SG1a and said second lens subgroup SG1b move toward the object side with a narrowing spacing between said first lens subgroup SG1b and said second lens subgroup SG1b, and
   said wide-angle zoom lens system is provided as a three-group zoom lens.

2. The wide-angle zoom lens system according to claim 1, wherein the first lens subgroup SG1a consists of one negative meniscus lens concave on an image side thereof.

3. The wide-angle zoom lens system according to claim 1, wherein the first lens subgroup SG1a is a lens group consisting of a lens in which a surface nearest to an object side thereof is convex on the object side.

4. A wide-angle zoom lens system, comprising in order from an object side to an image side thereof,
   a first lens group of negative retracting power,
   a second lens group of positive refracting power, and
   a third lens group of positive refracting power, wherein:
   upon zooming from a wide-angle end to a telephoto end,
      at least said first lens group and said second lens group move such that a spacing between said first lens group and said second lens group becomes narrow and a spacing between said second lens group and said third lens group becomes wide, and
   said first lens group comprises in order from an object side thereof,
   a 1-1$^{st}$ lens of negative refracting power,
   a 1-2$^{nd}$ lens of negative refracting power,
   a 1-3$^{rd}$ lens of negative refracting power,
   a 1-4$^{th}$ lens, and
   a 1-5$^{th}$ lens of positive refracting power.

5. The wide-angle zoom lens system according to claim 4, wherein the first lens group has at least one aspheric surface therein.

6. The wide-angle zoom lens system according to claim 4, wherein the 1-4$^{th}$ lens is a plastic lens having an aspheric surface.

7. The wide-angle zoom lens system according to claim 4, wherein the 1-4$^{th}$ lens is an aspheric lens having an aspheric surface, and satisfies the following conditions:

$$10<|f_{1\text{-}4}/f_w| \tag{1}$$

$$3<|r_7/f_w| \tag{2}$$

$$3<|r_8/f_w| \tag{3}$$

where $f_{1\text{-}4}$ is a focal length of the 1-4$^{th}$ lens, $r_7$ and $r_8$ are axial radii of curvature of an object-side surface and an image-side surface of the 1-4$^{th}$ lens, respectively, and $f_w$ is a focal length of a whole wide-angle zoom lens system at the wide-angle end.

8. The wide-angle zoom lens system according to claim 7, wherein said aspheric surface is located on the object-side surface of the 1-4$^{th}$ lens, and configured in such a way as to have refracting power in a positive direction with distance of a center thereof.

9. The wide-angle zoom lens system according to claim 4, which is provided as a three-group zoom lens.

10. A wide-angle zoom lens system, comprising in order from an object side to an image side thereof,
   a first lens group of negative refracting power,
   a second lens group of positive refracting power, and
   a third lens group of positive refracting power, wherein:
   upon zooming from a wide-angle end to a telephoto end,
   at least said first lens group and said second lens group move such that a spacing between said first lens group and said second lens group becomes narrow and a spacing between said second lens group and said third lens group becomes wide, and
   said second lens group consists of, in order from an object side thereof,
   a 2-1$^{st}$ lens that is a positive meniscus lens convex on an object side thereof,
   a 2-2$^{nd}$ lens that is a positive meniscus lens convex on an object side thereof,
   a 2-3$^{rd}$ lens that is a negative lens,
   a 2-4$^{th}$ lens that is a positive lens, and
   a 2-5$^{th}$ lens that has an aspheric surface, wherein the 2-3$^{rd}$ lens and the 2-4$^{th}$ lens are cemented together with a cementing surface having divergent refracting power.

11. The wide-angle zoom lens system according to claim 10, wherein the cemented lens composed of the 2-3$^{rd}$ lens and the 2-4$^{th}$ lens satisfies the following condition:

$$0.365<N_{d23}-N_{d24} \tag{4}$$

where $N_{d23}$ and $N_{d24}$ are d-line refractive indices of the 2-3$^{rd}$ lens and the 2-4$^{th}$ lens, respectively.

12. The wide-angle zoom lens system according to claim 10, which is provided as a three-group zoom lens.

13. The wide-angle zoom lens system according to any one of claims 1, 4 and 10, wherein just in front of an object side of the second lens group, there is provided an aperture stop that moves in unison with the second lens group upon zooming.

14. The wide-angle zoom lens system according to claim 1, wherein the first lens group comprises in order from an object side thereof,
   a 1-1$^{st}$ lens of negative refracting power,
   a 1-2$^{nd}$ lens of negative refracting power,
   a 1-3$^{rd}$ lens of negative refracting power,
   a 1-4$^{th}$ lens, and
   a 1-5$^{th}$ lens of positive refracting power.

15. The wide-angle zoom lens system according to claim 1 or 4, wherein the second lens group consists of, in order from an object side thereof,
   a 2-1$^{st}$ lens that is a positive meniscus lens convex on an object side thereof,
   a 2-2$^{nd}$ lens that is a positive meniscus lens convex on an object side thereof,
   a 2-3$^{rd}$ lens that is a negative lens,
   a 2-4$^{th}$ lens that is a positive lens, and
   a 2-5$^{th}$ lens that has an aspheric surface, wherein the 2-3$^{rd}$ lens and the 2-4$^{th}$ lens are cemented together with a cementing surface having divergent refracting power.

16. The wide-angle zoom lens system according to any one of claims 1, 4 and 10, wherein the third lens group remains fixed upon zooming.

17. The wide-angle zoom lens system according to any one of the claims 1, 4 and 10, wherein the third lens group comprises a cemented lens consisting of a positive lens and a negative lens.

18. The wide-angle zoom lens system according to any one of the claims 1, 4 and 10, wherein the first lens group, the second lens group, and the third lens group comprise a positive lens and a negative lens.

19. The wide-angle zoom lens system according to any one of the claims 1, 4 and 10, wherein the first lens group, the second lens group, and the third lens group satisfies the following conditions:

$$-0.55<\phi_1/(-\phi_1+\phi_2+\phi_3)<-0.45 \tag{5}$$

$$0.35<\phi_2/(-\phi_1+\phi_2+\phi_3)<0.45 \tag{6}$$

$$0.05<\phi_3/(-\phi_1+\phi_2+\phi_3)<0.12 \tag{7}$$

where $\phi_1$, $\phi_2$ and $\phi_3$ are reciprocals of focal lengths of the first lens group, the second lens group and the third lens group, respectively.

* * * * *

UNITED STATES PATENT AND TRADEMARK OFFICE
CERTIFICATE OF CORRECTION

PATENT NO. : 7,199,943 B2
APPLICATION NO. : 11/213896
DATED : April 3, 2007
INVENTOR(S) : Yasutaka Kashiki It is certified that error appears in the above-identified patent and that said Letters Patent is hereby corrected as shown below:

Column 12, line 27, change "subgroup SGl$a$" to --subgroup SG1$a$-- and

Column 12, line 42, change "negative retracting power" to --negative refracting power--.

Signed and Sealed this

Fourth Day of September, 2007

JON W. DUDAS
*Director of the United States Patent and Trademark Office*